United States Patent [19]

Najafi-Sani et al.

[11] Patent Number: 5,008,513

[45] Date of Patent: Apr. 16, 1991

[54] SHAPING OF BONDED ABRASIVE PRODUCTS

[76] Inventors: Mohammad Najafi-Sani, 4 Heerlen Road, Ormonde, Johannesburg, Transvaal, South Africa; Philip A. Bex, 4 Hillcrest Road, Camberley, Surrey, United Kingdom

[21] Appl. No.: 435,199

[22] Filed: Nov. 9, 1989

[30] Foreign Application Priority Data

Nov. 10, 1988 [GB] United Kingdom ............... 8826305

[51] Int. Cl.$^5$ ............................................. B23K 26/00
[52] U.S. Cl. ........................... 219/121.69; 219/121.78
[58] Field of Search .................. 219/121.69, 121.68, 219/121.6, 121.85, 121.74, 121.78

[56] References Cited

U.S. PATENT DOCUMENTS

| | | | |
|---|---|---|---|
| 3,743,489 | 7/1973 | Wentorf, Jr. et al. | 51/307 |
| 3,745,623 | 7/1973 | Wentorf, Jr. et al. | 47/119 |
| 4,224,101 | 9/1980 | Tijburg et al. | 219/121.69 X |
| 4,387,287 | 6/1983 | Marazzi | 219/69.17 |
| 4,533,812 | 8/1985 | Lorenz | 219/121.69 X |

FOREIGN PATENT DOCUMENTS

| | | |
|---|---|---|
| 0010276 | 4/1980 | European Pat. Off. |
| 3608286 | 10/1986 | Fed. Rep. of Germany |
| 1489130 | 10/1977 | United Kingdom |
| 2113583 | 8/1983 | United Kingdom |

*Primary Examiner*—C. L. Albritton
*Attorney, Agent, or Firm*—Scully, Scott, Murphy & Presser

[57] ABSTRACT

A layer of material is removed from a surface of a bonded abrasive product by directing a laser beam at the surface, causing the laser beam to traverse the surface to damage the surface to a desired depth and removing the damaged material remaining on the surface, for example by lapping. The bonded abrasive product is particularly a diamond compact.

7 Claims, 1 Drawing Sheet

SHAPING OF BONDED ABRASIVE PRODUCTS

BACKGROUND OF THE INVENTION

This invention relates to the shaping of bonded abrasive products, particularly abrasive compacts.

Abrasive compacts are well known in the art and are used extensively in industry for the abrading of various workpieces. They consist essentially of a mass of abrasive particles generally present in an amount of at least 70 percent, preferably 80 to 90 percent, by volume of the compact bonded into a hard conglomerate. Compacts are polycrystalline masses having diamond-to-diamond bonding and can replace single large crystals. The abrasive paricles of compacts are invariably ultra-hard abrasives such as diamond and cubic boron nitride. Diamond compacts are also known in the art as polycrystalline diamond or pcd.

Abrasive compacts are often bonded to a substrate such as a cemented carbide substrate. Such products are known in the art as composite abrasive compacts. Examples of specifications which describe composite abrasive compacts are U.S. Pat. Nos. 3,745,623 and 3,743,489 and British Specification No. 1,489,130.

It is possible to produce large disc-shaped diamond composite compacts. The carbide substrate of such large composite compacts tends to bend to a bow-shape during manufacture. Industry calls for diamond compact layers of such composite compacts within precise tolerances. To meet this requirement in the light of the bending problem, it is the practice to produce composite compacts with thicker diamond layers which are then lapped to the required thickness. Lapping is achieved using diamond and much diamond is consumed during lapping. This is expensive.

SUMMARY OF THE INVENTION

According to the present invention, there is provided a method of removing a layer of material from a surface of a bonded abrasive product, particularly an abrasive compact, including the steps of directing a laser beam at a surface of the product, causing the laser beam to traverse the surface to damage it to a desired depth, and removing damaged material remaining thereon.

DECRIPTION OF EMBODIMENTS

The surface of the abrasive product is damaged by means of a laser beam which is caused to traverse that surface. The laser beam will be focused on that surface or just below or just above the surface. The depth of the damage will be dependent on the energy of the laser beam and the speed with which it is caused to traverse the surface of the product being damaged and the laser beam spot size.

Depending on the nature of the bonded abrasive product, damaged material from the product will remain on the product from where it must be removed or some of the damaged material will sublime and some will remain on the product from where it must be removed.

The laser beam can be caused to traverse the surface in any desired pattern. The laser beam may be caused to traverse the surface more than once, i.e. multiple passes, at a fast speed, e.g. a speed of at least 20 m/minute. It has been found for many products that better control of the damaged layer can be achieved using multiple passes at a fast traversing speed.

One preferred manner of carrying out the invention is first to create substantial damage, e.g. of several hundred microns depth, on one or more passes, followed by lesser damage, e.g. less than 100 microns depth, on a final pass. Differences in damage can be achieved by varying one or more of the parameters mentioned above.

Removal of the damage remaining on the surface/product may be achieved by standard lapping or other similar means. The surface may be rendered smooth by polishing or fine lapping.

The invention has application to various bonded abrasive products by finds paricular application with abrasive compacts. Diamond compacts, as mentioned above, are difficult to lap because of the abrasiveness of the diamond and much diamond is consumed during lapping. The laser beam damages the diamond or cubic boron nitride causing much of it to sublime and what remains of the damaged material will mainly be graphite or amorphous carbon in the case of diamond and hexagonal boron nitride in the case of cubic boron nitride. These materials are easily removed by lapping. In this manner layers of abrasive compact can be removed relatively inexpensively.

Removal of the remaining damaged material leaves an essentially clean surface which can be polished or given a fine lapped finish. The polished surface will be a smooth one. The invention can also be used to produce a rough surface on the bonded abrasive product.

The invention has paricular application to large disc-shaped diamond compacts, i.e. those having a diameter of at least 13 mm, where it is desired to remove a thin layer of the compact from one of the major flat surfaces thereof.

Figure 1:
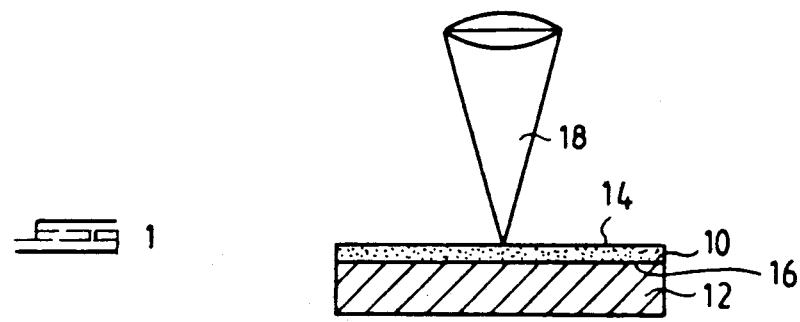
FIGS. 1 to 3 illustrate schematically embodiments of the invention.
Figure 2:
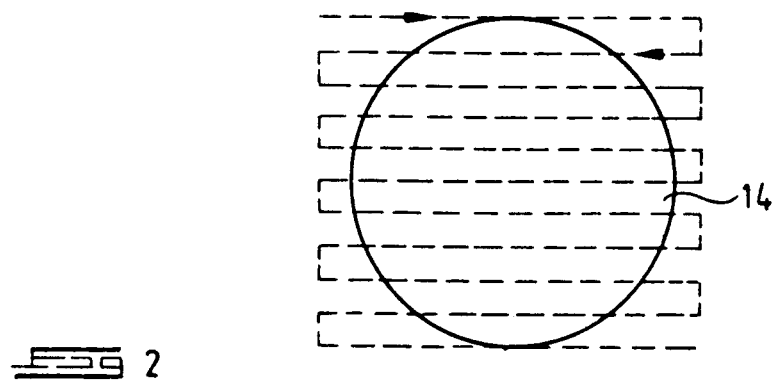
Figure 3:
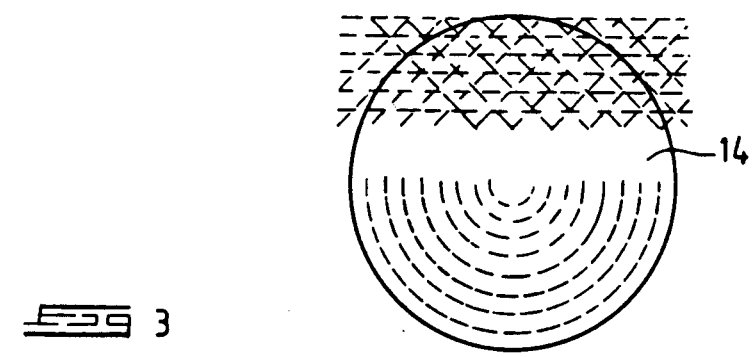

Embodiments of the invention will now be described. Referring first to FIG. 1, a composite diamond compact consists of a diamond compact layer 10 bonded to a cemented carbide substrate 12. The composite compact is of disc-shape. The diamond compact layer 10 has an upper major flat surface 14 and a lower major flat surface 16 bonded to the cemented carbide substrate 12. A laser beam 18 is focused on the surface 14 and then caused to traverse this surface in any one of a number of desired patterns. One such pattern is illustrated by FIG. 2, while several possible patterns are illustrated by FIG. 3. The important point is that the entire surface is traversed so that the entire surface is damaged to a desired depth. This damage will cause some of the diamond to sublime. A thin layer of damaged diamond in the form mainly of graphite and amorphous carbon remains on the surface. This layer may be removed by lapping leaving an essentially flat surface which can be fine lapped. Although lapping involves the use of diamond, the consumption of diamond in this step is very much less than is the case if the material being removed had not been damaged, i.e. was bonded diamond. The depth of the damage created by the laser can be varied by varying the nature or energy of the laser beam or varying the speed at which the laser beam is caused to traverse the surface 14 or varying the laser beam spot size.

The invention enables diamond compacts to be produced having thicknesses within tight tolerances and a smooth essentially flat exposed surface. This can be achieved without the consumption of large quantities of expensive diamond.

In an example of the invention, a composite diamond abrasive compact as illustrated by FIG. 1 consisted of a diamond compact layer 10 bonded to a cemented carbide substrate 12. The diaqmond compact layer consisted of a mass of 90% by volume diamond containing substantial diamond-to-diamond bonding and a second phase consisting essentially of cobalt. The upper flat surface 14 of the compact layer was damaged by causing a laser beam having a spot size of 0.2 mm in diameter to be focused on that surface then causing the beam to traverse the surface in the manner illustrated by FIG. 2. The power of the laser beam was 1.5 to 2.5 KW and it was caused to traverse the surface 14 at a rate of 40 m/minute. The laser beam was caused 135 a lower power and this produced a damaged layer of depth approximately 350 microns. Most of this damaged layer sublimed leaving only a thin layer, i.e. about 50 microns, of damaged material. The damaged material, i.e. mainly graphite and amorphous carbon, was removed by lapping, exposing an essentially flat surface of compact which was fine lapped. A smooth, essentially flat surface resulted.

In a second example of the invention, a thermally stable diamond compact of disc-shape and consisting of a mass of bonded diamond particles having substantial diamond-to-diamond bonding and a second phase of silicon in the form of silicon and silicon carbide had a layer removed from one of its flat surfaces. A laser beam of power 1.67 KW was focused on the surface and caused to traverse that surface in the manner illustrated in FIG. 2. The traverse rate was 20 m/minute and one pass only was made. It was found that damage to a depth of 600 microns occurred. The damaged material remaining was removed by lapping and this left a striated, roughened surface. This surface provided a good mechanical key to the working face of a drill bit in which is was mounted.

We claim:

1. A method of removing a layer of material from the surface of a bonded abrasive compact including the steps of directing a laser beam at the surface of a bonded abrasive compact, while causing the laser beam to traverse the surface to damage it to a desired depth, wherein the laser beam is first caused to traverse the surface of the bonded abrasive compact in one or more passes creating substantial damage to the surface, followed by a final pass which creates lesser damage, and removing damaged material remaining on the surface.

2. A method according to claim 1, wherein the substantial damage produces damage to a depth of several hundred microns.

3. A method according to claim 1, wherein the lesser damage is damage to a depth of no more than 100 microns.

4. A method according to claim 1, wherein the bonded abrasive compact is a disc-shaped diamond compact having a major flat surface on each of opposite sides thereof, and the laser beam is directed at one of the major flat surfaces.

5. A method according to claim 4, wherein the disc-shaped compact has a diameter of at least 13 millimeters.

6. A method according to claim 1, wherein the laser beam is focused on, or just below, or just above the surface of the bonded abrasive compact.

7. A method according to claim 1, wherein the bonded abrasive compact has a diameter of at least 13 millimeters.

* * * * *